United States Patent
Sato et al.

(10) Patent No.: US 6,640,627 B2
(45) Date of Patent: Nov. 4, 2003

(54) FLUID FLOW METER HAVING A FLUORINE-CONTAINING SEALANT WHICH MAINTAINS SILICON-CONTAINING FILLER IN INSTALLATION RECESS

(75) Inventors: Kunihiko Sato, Gunma (JP); Fumikazu Miyamoto, Gunma (JP); Kiyoshi Yoshii, Gunma (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/969,862

(22) Filed: Oct. 4, 2001

(65) Prior Publication Data

US 2002/0069699 A1 Jun. 13, 2002

(30) Foreign Application Priority Data

Dec. 11, 2000 (JP) .......................... 2000-376454

(51) Int. Cl.[7] ................................ G01F 1/68
(52) U.S. Cl. ................................. 73/204.22
(58) Field of Search .................. 73/204.22, 204.12, 73/204.13, 116, 118.1; 204/424, 427, 428

(56) References Cited

U.S. PATENT DOCUMENTS 4,802,369 A * 2/1989 Morii .......................... 204/424
5,679,226 A * 10/1997 Furusaki et al. ............ 204/424

FOREIGN PATENT DOCUMENTS

JP 2000-2572 1/2000

* cited by examiner

Primary Examiner—Harshad Patel
(74) Attorney, Agent, or Firm—Foley & Lardner

(57) ABSTRACT

A fluid flow meter is disposed in a conduit. A casing of the flow meter includes a main body section defining a circuit board installation recess, and has a peripheral wall section projecting from the main body section so as to surround the circuit board installation recess. A part of the peripheral wall section is cut out to form an installation plate insertion groove. A silicon-containing filler is disposed in the board installation recess of the casing to cover the circuit board. A fluorine-containing sealant is disposed in the board installation recess close to the installation plate insertion groove so as to seal the installation plate insertion groove and maintain the silicon-containing filler inside the board installation recess.

5 Claims, 7 Drawing Sheets

FLUID FLOW METER HAVING A FLUORINE-CONTAINING SEALANT WHICH MAINTAINS SILICON-CONTAINING FILLER IN INSTALLATION RECESS

BACKGROUND OF THE INVENTION

This invention relates to improvements in a fluid flow meter for detecting a flow amount of gas, and more particularly to the fluid (air) flow meter suitable for detecting a flow amount of intake air of an automotive engine and the like.

In general, automotive engines or the like are arranged such that the flow amount of intake air of the engine is detected by an air flow meter or sensor, and then the injection amount or the like of fuel is determined in accordance with a detected value of the intake air flow amount, thereby forming air-fuel mixture having an appropriate air-fuel ratio upon mixing intake air and fuel A typical one of air flow meters used for the above purpose is disclosed in Japanese Patent Provisional Publication No. 2000-2572 and arranged as follows: An air flow meter includes a casing installed to an intake air pipe in which intake air flows. The casing includes a main body section defining a board installation recess, and a peripheral wall section projecting from the main body section and surrounding the board installation recess. A part (abutting to the inside of the intake air pipe) of the peripheral wall section is cut out to form an installation plate insertion groove. An installation plate is provided including a board installation section disposed in the board installation recess, and an element installation section extending from the board installation section through the installation plate insertion groove to outside of the board installation recess. A circuit board is disposed on the board installation section of the installation plate. Electronic parts are provided to the circuit board. Additionally, an air flow sensor element is disposed on the element installation section of the installation plate so as to detect a flow amount of intake air.

In such an air flow sensor element, a temperature sensing resistor and a heater are formed on a silicon substrate by using metal thin film made of platinum or the like. The air flow sensor element is formed extending through the installation plate insertion groove into the board installation groove so that a part of the air flow sensor is located within the board installation groove. The part of the air flow sensor is connected to the circuit board to constitute a bridge circuit and the like. The temperature sensing resistor of the air flow sensor element is to be in contact with flow of intake air and cooled by intake air, under a condition where the temperature sensing resistor is heated by the heater. At this time, change in temperature (electrical resistance value) of the temperature sensing resistor is detected as a flow amount of intake air.

During operation of the engine, a part of intake air flowing the intake air pipe tends to penetrate into the board installation recess through the installation plate insertion groove. Accordingly, for example, a silicon-containing material gel is previously filled in the board installation recess and then solidified thereby covering the circuit board with this silicon-containing material, thus protecting the circuit board from dust, water and the like contained in intake air, in the above conventional technique disclosed in Japanese Patent Provisional Publication No. 2000-2572.

However, most automotive vehicles are equipped with an evaporative emission control system and/or an exhaust gas recirculating system. In the evaporative emission control system, evaporative gas or fuel gas generated within a fuel tank is flown into the intake air passageway to be mixed with intake air in order to prevent the evaporative gas from being released to the atmospheric air. The evaporative gas mixed with intake air is supplied to the engine to be combusted. In the exhaust gas recirculating system, a part of exhaust gas is recirculated through the intake air pipe into the engine in order to purify exhaust gas.

As a result of operation of the evaporative emission control system and/or the exhaust gas recirculating system, intake air flowing through the intake air pipe possibly contains the volatile (fuel) components of gasoline or light oil (diesel fuel). Consequently, when intake air penetrates into the board installation recess of the air flow meter and comes into contact with the silicon-containing material, there is the possibility that the silicon-containing material deteriorates owing to its swelling and melts to be flown out, because the silicon-containing material is low in durability against the volatile (fuel) components.

Thus, in the conventional technique, the silicon-containing material within the board installation recess may melt and flow out though the installation plate insertion groove so as to adhere onto the temperature sensing resistor and the like. This may make unstable the detection accuracy of the measured air flow amount while lowering the reliability of the air flow meter.

SUMMARY OF THE INVENTION

It is an object of the present invention to provide an improved fluid (air) flow meter which can effectively overcome drawbacks encountered in similar conventional fluid flow meters.

Another object of the present invention is to provide an improved fluid (air) flow meter using a fluid flow sensor element, which can stably detect the flow amount of a measured fluid at a high accuracy throughout a long time, while improving the reliability of the fluid flow meter.

A further object of the present invention is to provide an improved fluid (air) flow meter using a fluid flow sensor element, in which a silicon-containing material or filler filled in a board installation recess of a casing can be effectively prevented from being deteriorated by a component contained in a measured fluid.

An aspect of the present invention resides in a fluid flow meter comprising a casing installed to a conduit in which a measured gas flows. The casing includes a main body section defining a board installation recess, and a peripheral wall section projecting from the main body section and surrounding the board installation recess, a part of the peripheral wall section being cut out to form an installation plate insertion groove, the part abutting to an inside of the conduit. An installation plate is provided including a board installation section disposed in the board installation recess, and an element installation section extending from the board installation section through the installation plate insertion groove to an outside of the board installation recess. A circuit board is disposed on the board installation section of the installation plate, electronic parts being provided to the circuit board. A gas flow sensor element is disposed on the element installation section of the installation plate, the gas flow sensor element detecting a flow amount of the measured gas. A silicon-containing filler is disposed in the board installation recess of the casing to cover the circuit board, the silicon-containing filler being formed of a material containing silicon. Additionally, a fluorine-containing sealant is disposed in the board installation recess at a portion close to the installation plate insertion groove, the fluorine-containing sealant sealing the installation plate insertion groove so as to maintain the silicon-containing sealant inside the board installation recess, the fluorine-containing sealant being formed of a material whose major component is a polymer containing fluorine.

Another aspect of the present invention resides in an air flow meter for intake air of an automotive internal combustion engine. The air flow meter comprising a casing installed to an intake air pipe in which intake air flows. The casing includes a main body section defining a board installation recess, and a peripheral wall section projecting from the main body section and surrounding the board installation recess, a part of the peripheral wall section being cut out to form first and second end portions which are separate from each other to define therebetween an installation plate insertion groove, the part abutting to an inside of the conduit, the first and second end portions having respectively first and second edges which face each other and parallel with each other. An installation plate includes a board installation section disposed in the board installation recess, and an element installation section extending from the board installation section through the installation plate insertion groove to an outside of the board installation recess. A circuit board is disposed on the board installation section of the installation plate, electronic parts being provided to the circuit board. An air flow sensor element is disposed on the element installation section of the installation plate, the air flow sensor detecting a flow amount of intake air, the air flow sensor element including a temperature sensing resistor. A silicon-containing filler is disposed in the board installation recess of the casing to cover the circuit board, the silicon-containing filler being formed of a material containing silicon. A fluorine-containing sealant is disposed in the board installation recess at a portion close to the installation plate insertion groove, the fluorine-containing sealant sealing the installation plate insertion groove so as to maintain the silicon-containing sealant inside the board installation recess, the fluorine-containing sealant being formed of a material whose major component is a polymer containing fluorine. Additionally, a plate-shaped stopper member is connected to the casing and inserted in the installation plate insertion groove of the casing and fitted between the first and second edges of the respective first and second end portions of the peripheral wall section of the casing. The stopper member has a tip end in contact with the air flow sensor element. The temperature sensing resistor of the air flow sensor element and the silicon-containing filler are located respectively on opposite sides of the stopper member.

The other objects and features of this invention will become understood from the following description with reference to the accompanying drawings.

BRIEF DESCRIPTION OF THE DRAWINGS

In the drawings, like reference numerals designate like parts and elements throughout all figures, in which:

FIG. 4 is an enlarged fragmentary front view of a casing of the fluid flow meter of FIG. 1, illustrating a silicon-containing filler, a fluorine-containing sealant and the like;

DETAILED DESCRIPTION OF THE INVENTION

Figure 1:
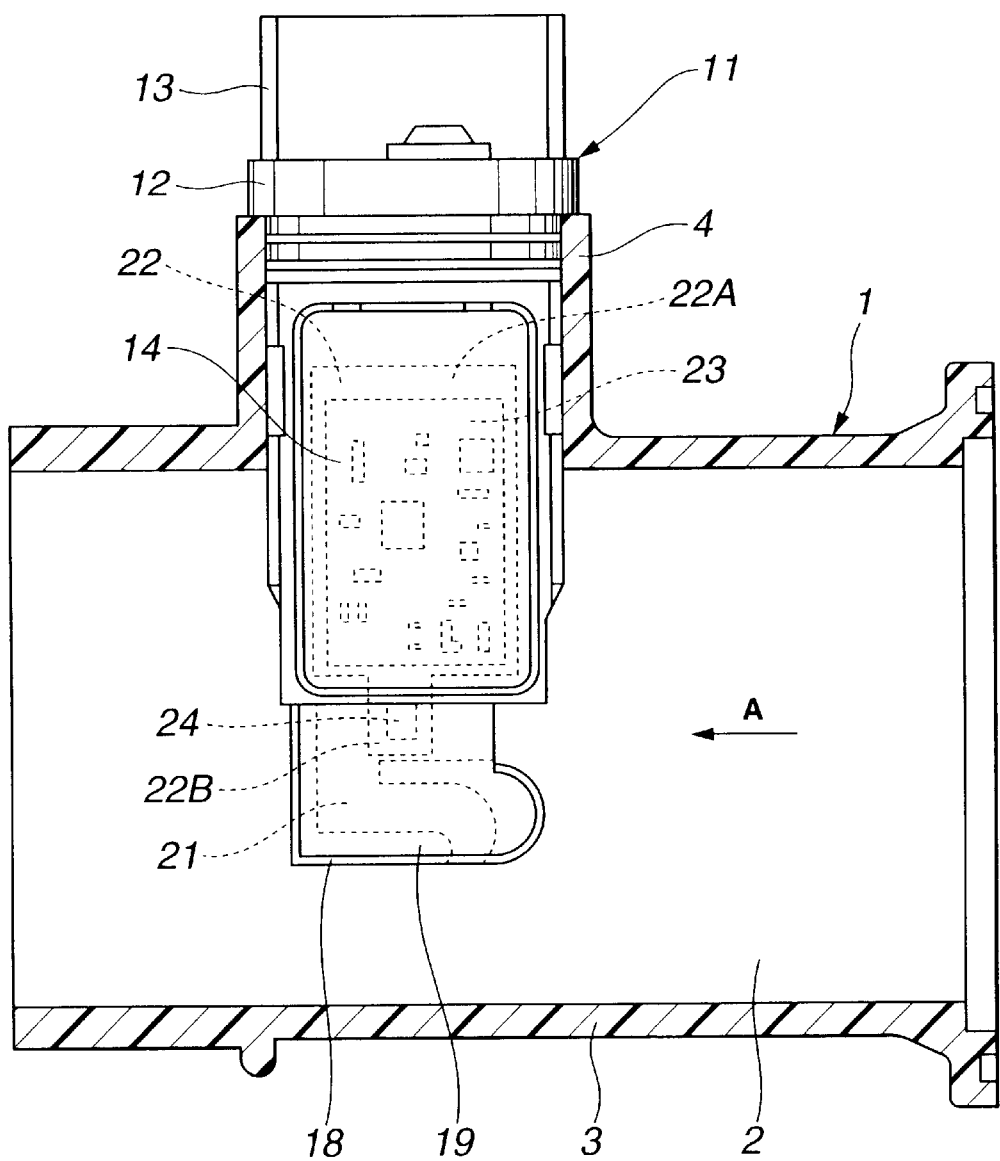
FIG. 1 is a vertical sectional view of an embodiment of a fluid flow meter according to the present invention, in a condition to be installed to a conduit.

Referring now to FIG. 1 of the drawings, an embodiment of a fluid or gas flow meter according to the present invention is illustrated. In this embodiment, the fluid flow meter is an air flow meter for measuring an amount of air flowing though an intake air passageway or pipe of an internal combustion engine of an automotive vehicle. A cylindrical conduit 1 formed of plastic (synthetic resin), metal or the like is coaxially connected or inserted in the intake air pipe. Conduit 1 is formed thereinside an air flow passage 2 through which intake air (or measured fluid or gas) flows from the side of an air cleaner (not shown) to the side of combustion chambers (not shown) of the engine. A peripheral cylindrical wall 3 of conduit 1 is formed with a cylindrical boss section 4 which extends radially outwardly. The inside of boss section 4 is in communication with air flow passage 2.

Figure 2:
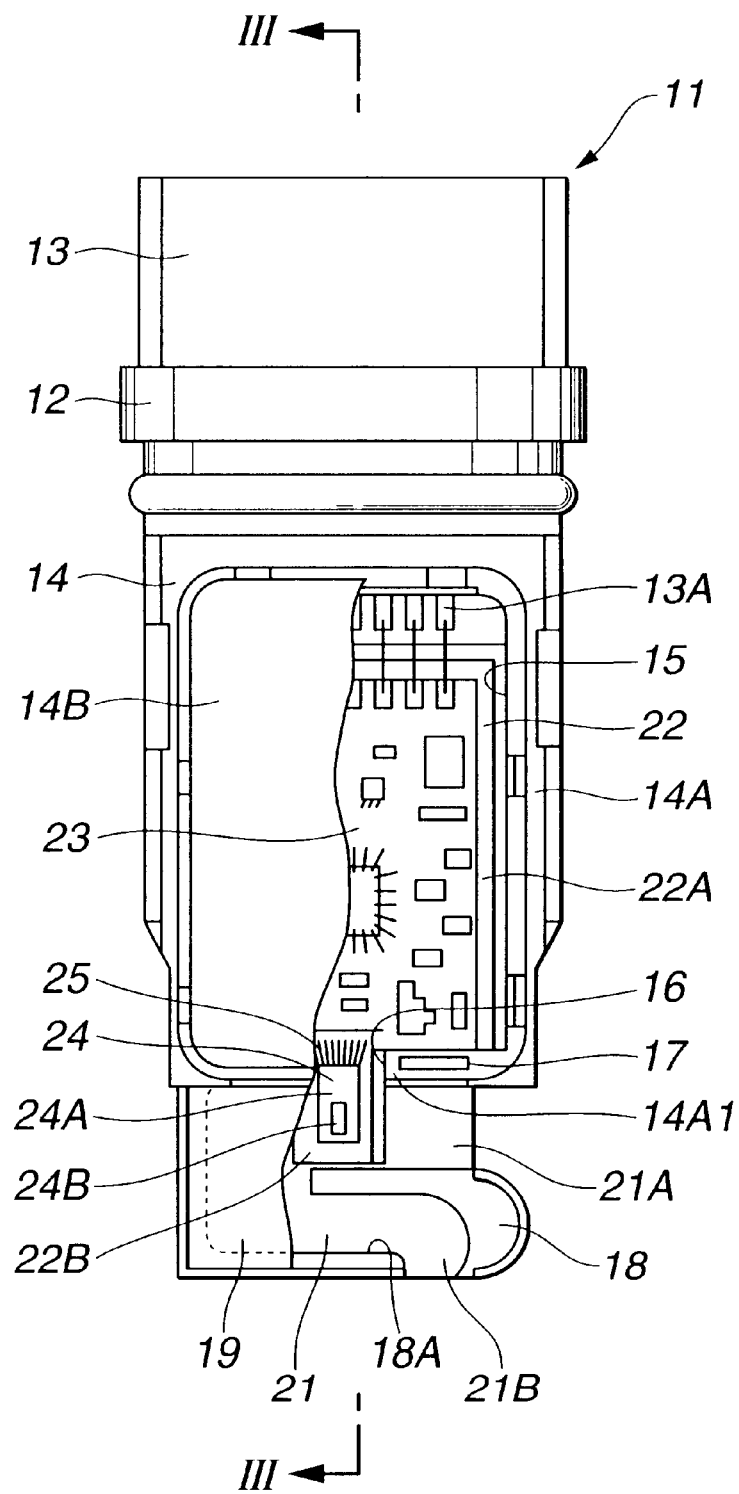
FIG. 2 is a front elevation, partly in section, of the fluid flow meter of FIG. 1.
Figure 3:
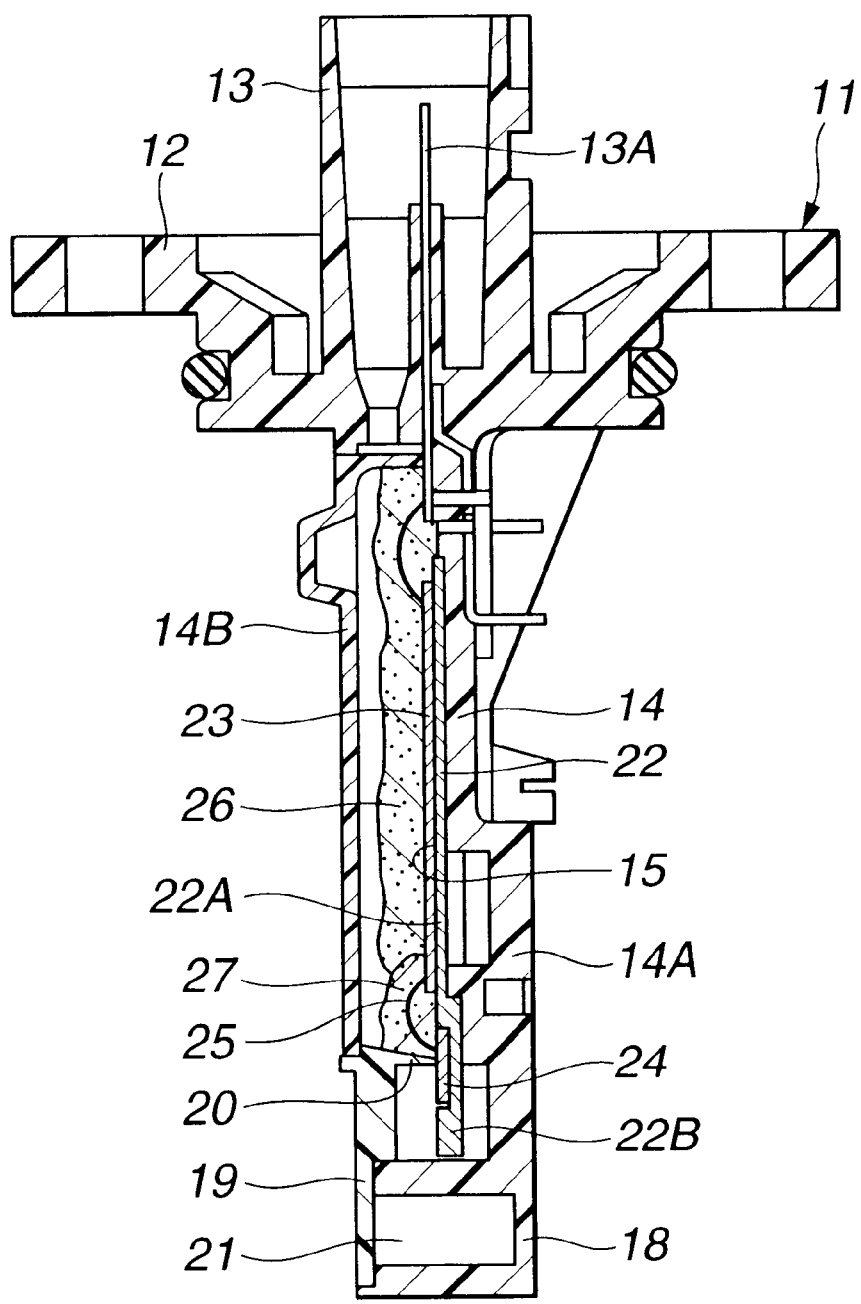
FIG. 3 is a vertical sectional view taken in the direction of arrows substantially along the line III—III of FIG. 2.

The air flow meter includes a casing 11 which forms the main body of the air flow meter and is formed of plastic, metal or the like. As shown in FIGS. 2 and 3, casing 11 includes an installation section 12, a circuit accommodating section 14 and a passage forming member 18, and the like which are formed integral with each other to constitute casing 11. A major part of casing 11 is inserted in and fitted inside boss section 4 of conduit 1. An installation section 12 of casing 11 is fitted to the tip end portion of boss section 4 and provided with a connector section 13 having pin terminals 13A located outside conduit 1.

Circuit accommodating section 14 is formed generally box-shaped and rectangular in section, and extends from installation section 12 to the inside of conduit 1 so that the tip end portion of circuit accommodating section projects inside the conduit 1. Circuit accommodating section 14 includes an accommodating casing 14A which is opened to the left side in FIG. 3. A lid plate 14B closes the opened side of accommodating casing 14A upon being put on the accommodating casing 14A. Lid plate 14B is formed generally rectangular in section. Accommodating casing 14A of circuit accommodating section 14 has a main body section (not identified) which is formed thereinside with a board installation recess 15 in which a circuit board 23 discussed after is installed.

Figure 6:
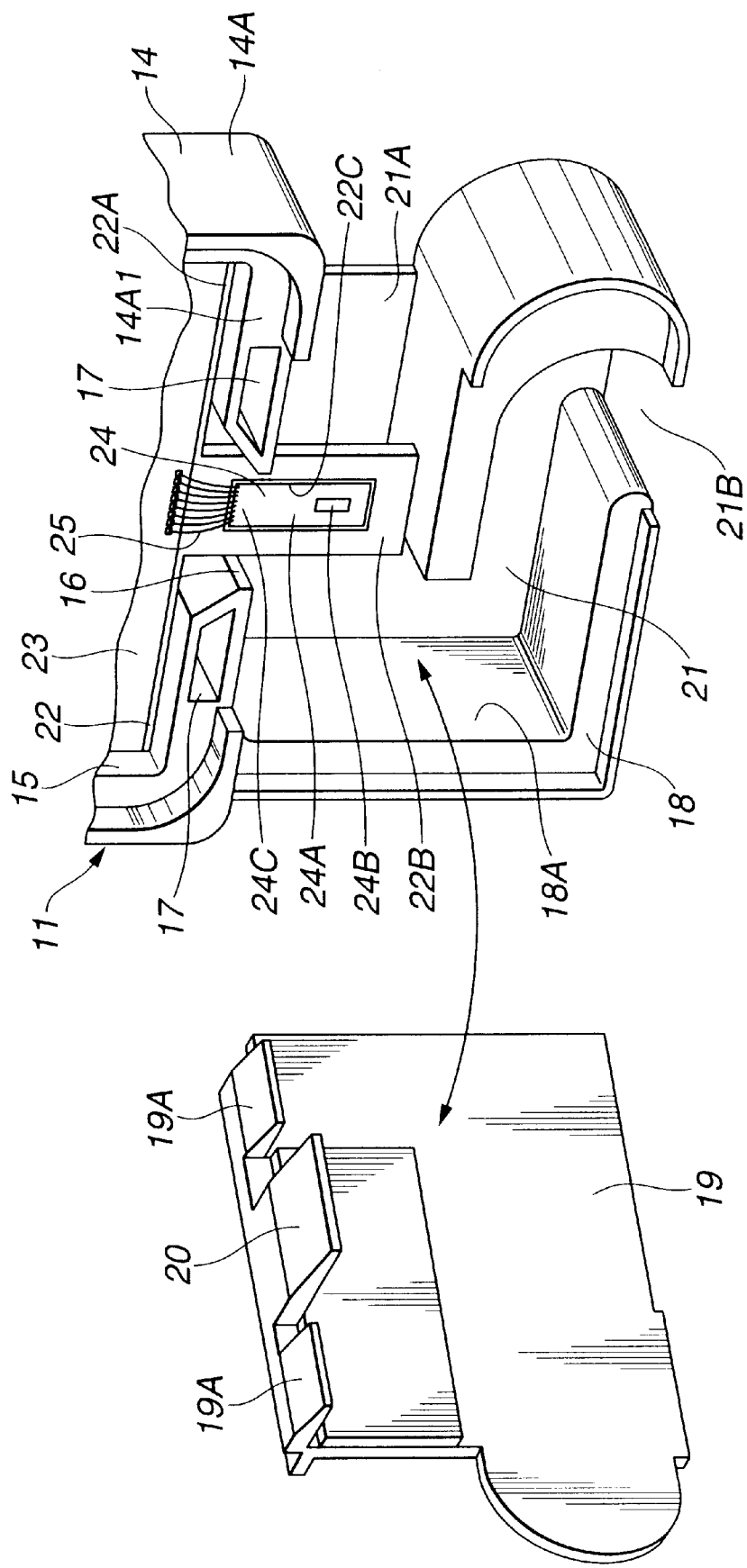
FIG. 6 is an enlarged fragmentary perspective view showing a passage forming member in a condition made before installation of a lid member to the passage forming member, in the fluid flow meter of FIG. 1.

As shown in FIG. 6, accommodating casing 14A has a peripheral wall section 14A1 which projects from the main body section of the accommodating casing 14A and is located generally surrounding board installation recess 15. Peripheral wall section 14A1 has a generally straight portion which faces a bypass passage 21 which will be discussed after. A central part of the straight portion of peripheral wall section 14A1 is cutout to form a generally rectangular cutout (in section). As a result, two end portions (no numerals) which face each other and separate from each other are formed. An installation plate insertion groove 16 is formed between the two end portions of peripheral wall section 14A1. Two end portions of peripheral wall section 14A1 has respectively two edges which extend parallel with each other, and are respectively formed with fitting holes 17, 17.

Passage forming member 18 is formed integral with a projected end of circuit accommodating section 14 which projects inside the conduit 1. Passage forming member 18 is formed of plastic, metal or the like and integral with accommodating casing 14A of circuit accommodating section 14. Passage forming member 18 is formed with a generally U-shaped groove 18A which opens to the side of passage forming member 18.

Figure 4:
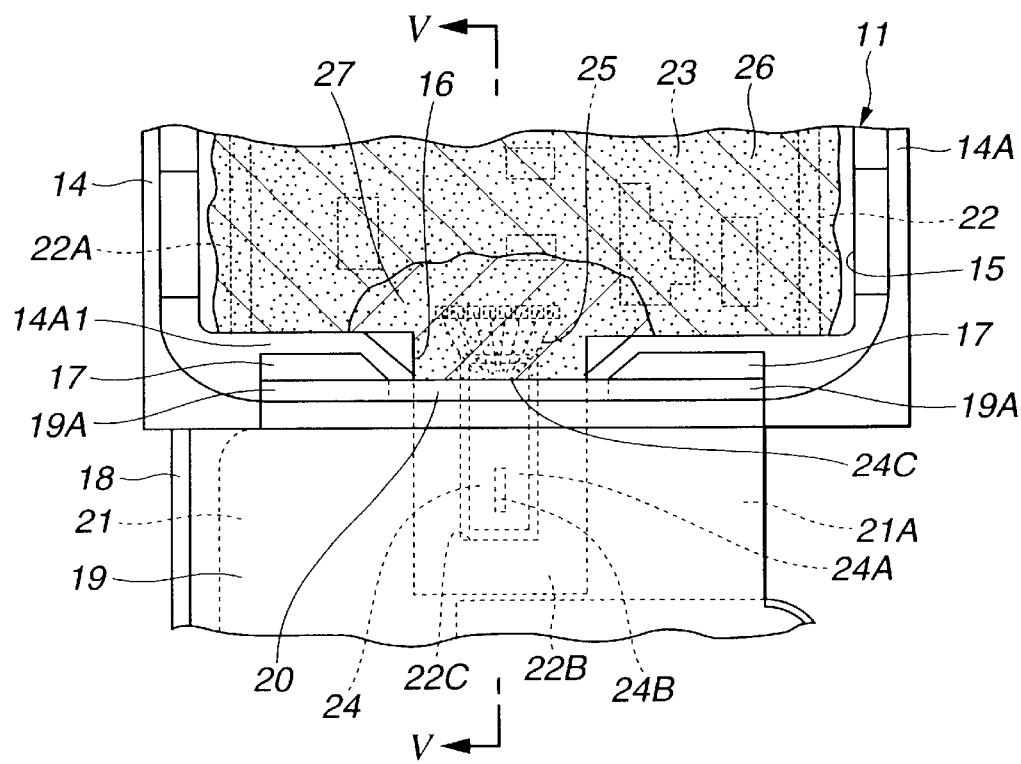

A lid member 19 is provided to be installed to the side of passage forming member 18 so as to close U-shaped groove 18A at the side of passage forming member 18. Lid member 19 is formed of plastic plate, metal plate or the like, and integrally formed at its outer peripheral portion with two claw portions 19A, 19A which project toward circuit accommodating section 14 as shown in FIGS. 4 and 6. Lid member 19 is integrally formed with a stopper member 20 which is located between two claw portions 19A, 19A and will be discussed after. Lid member 19 is fixed to the side surface of the passage forming member 18, for example, by means of adhesion or the like upon fitting of respective claw portions 19A, 19A to fitting holes 17, 17, thereby closing the side of U-shaped groove 18A. As a result, U-shaped bypass passage 21 is formed.

Figure 5:
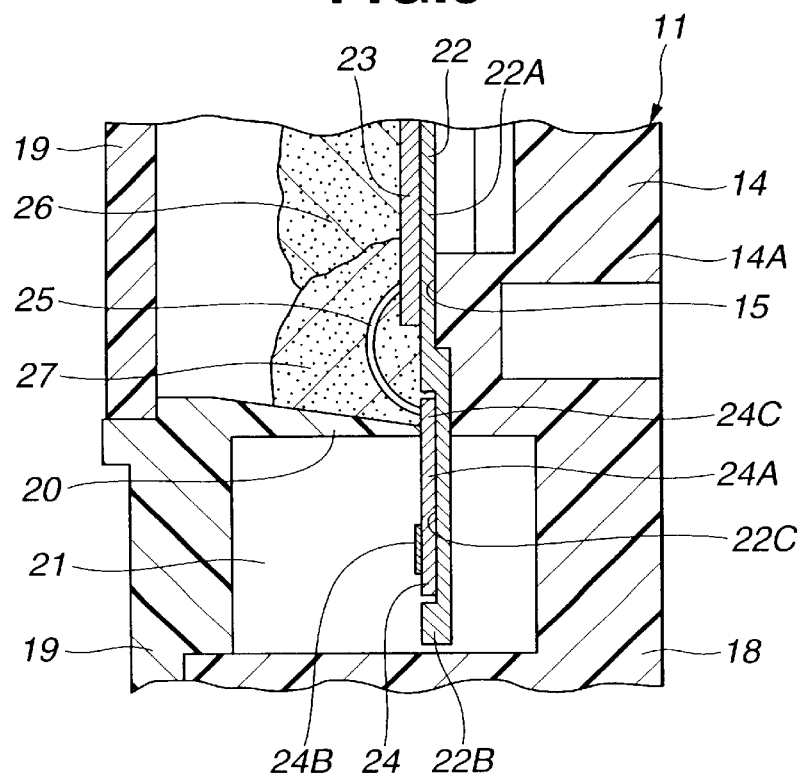
FIG. 5 is an enlarged fragmentary sectional view taken in the direction of arrows substantially along the line V—V of FIG. 4.

Stopper member 20 formed in passage forming member 18 is a plate-shaped small piece which projects from lid member 19 toward installation plate insertion groove 16 and has a width corresponding to that of installation plate insertion groove 16. Additionally, in a condition where lid member 19 is installed to passage forming member 18, stopper member 20 closes installation plate insertion groove 16 and has its tip end portion which is generally in contact with the surface of a base plate 24A at a position between a temperature sensing resistor 24B and a connecting section 24C of an air flow sensor element 24 which will be discussed after, as shown in FIGS. 4 and 5. It will be understood that stopper member 20 is fitted between the opposed edges of the end portions of the peripheral wall section 14A1.

With the above arrangement, stopper member 20 is disposed in a manner to isolate the inside of board installation recess 15 from bypass passage 21, thereby preventing a gel material of a sealant 27 from flowing out through installation plate insertion groove 16 during assembly operation of the air flow meter and preventing the sealant 27 from being dispersed out owing to deterioration with age during use of the air flow meter, as will be discussed in detail after. The sealant 27 is formed of a material whose major component is a polymer (fluororesin) containing fluorine.

Bypass passage 21 is formed between passage forming member 18 (having groove 18A) and lid member 19 and bent to be generally U-shaped as shown in FIGS. 2 and 6. Bypass passage 21 has a one end portion serving as an air inflow opening 21A which opens to the inside of the conduit 1 at a position upstream of the installation plate insertion groove 16. The other end portion of bypass passage 21 serves as an air outflow opening 21B which is opened to the bottom surface side of passage forming member 18.

An installation plate 22 is disposed in circuit accommodating section 14 and formed, for example, of a rectangular metal plate or the like. Installation plate 22 includes a board installation section 22A which is disposed in board installation recess 15 of accommodating casing 14A. Circuit board 23 is mounted on board installation section 22A. Installation plate 22 further includes an element installation section 22B which extends from board installation section 22A and projects through installation plate insertion groove 16 into bypass passage 21. Element installation section 22B is formed with a rectangular recess 22C in which air flow sensor element 24 discussed after is installed.

Circuit board 23 is generally rectangular in plan and mounted on board installation section 22A. Circuit board 23 is accommodated in board installation recess 15 in circuit accommodating section 14. Additionally, a plurality of electronic parts are mounted on circuit board 23 and adapted to make input and output of electrical signals between it and air flow sensor element 24. These electronic parts are connected to pin terminals 13A of connector section 13 through bonding wires and the like.

Air flow sensor element 24 is installed to element installation section 22B and includes a base plate or substrate 24A which is formed generally into the shape of an elongate rectangle and formed of a silicon plate or the like, as shown in FIG. 5. Base plate 24A is fixed in recess 22C of element installation section 22B of installation plate 22. Temperature sensing resistor 24B is mounted on base plate 24A and formed of a metal thin film formed of platinum or the like. A heater (not shown) is provided to heat temperature sensing resistor 24B.

Temperature sensing resistor 24B is located at a one side of base plate 24A in the direction of length of the base plate and exposed in bypass passage 21. The other side of base plate 24A in the length direction of the base plate serves as a connecting section 24C including a plurality of electrode pads (not shown) extending respectively from temperature sensing resistor 24B and heater, and the like. Connecting section 24C extends to the inside of circuit accommodating section 14 through installation plate insertion groove 16 of circuit accommodating section 14 and over stopper member 2. Electrode pads and the like are connected to circuit board 23 through bonding wires 25, 25, . . . .

Temperature sensing resistor 24B of air flow sensor element 24 is to be in contact with flow of intake air and cooled by intake air, under a condition where the temperature sensing resistor is heated by heater. At this time, change in temperature (electrical resistance value) of temperature sensing resistor 24B is detected as a flow amount of intake air and output as a detection signal out of the air flow meter through circuit board 23, connector section 13, and the like.

An insulating silicon-containing filler 26 is disposed or filled in board installation recess 15 of circuit accommodating section 14. For example, silicon-containing filler 26 is formed by filling a gel of a silicon-containing material into the board installation recess 15 and then by solidifying the filled gel. The silicon-containing filler is, for example, made of a material whose major component is silicone resin. As shown in FIGS. 3 and 5, the almost whole of circuit board 23 is covered with silicon-containing filler 26 and fluorine-containing sealant 27.

Insulating fluorine-containing sealant 27 is filled and disposed around installation plate insertion groove 16 and in board installation recess 15 of circuit accommodating section 14. Fluorine-containing sealant 27 is formed of a material whose major component is a polymer containing fluorine, such as fluororesin. The fluorine-containing sealant is, for example, of a rubber-like elastomeric material which is called a fluorine-containing elastomer. Fluorine-containing sealant 27 is formed by previously applying a gel polymer material containing fluorine as shown in FIGS. 4 and 5 and then by solidifying the gel polymer material. Fluorine-containing sealant 27 is highly durable and resistant to volatile (fuel) components of gasoline, light oil (diesel fuel) and the like.

Fluorine-containing sealant 27 is applied and adhered around the opening of installation plate insertion groove 16 and the inner or upper surface of stopper member 20. Accordingly, fluorine-containing sealant 27 seals a small clearance formed among members or sections defining installation plate insertion groove 16, installation plate 22, the surface of air flow sensor element 24 and stopper member 20 and closes installation plate insertion groove 16 to maintain an air-tight seal in cooperation with stopper member 20. Fluorine-containing sealant 27 can prevent intake air flowing in conduit 1 from penetrating into circuit accommodating section 14 thereby protecting circuit board 23, bonding wires 25 and the like from dust, water and the like in intake air. Additionally, fluorine-containing sealant 27 can interrupt the contact of silicon-containing filler 26 with intake air. This prevents silicon-containing filler 26 from melting and leaking outside upon deterioration of silicon-containing filler caused by contact of the silicon-containing filler with the volatile components, even in case that the volatile components are contained in intake air.

Manner of operation of the above air flow meter will be discussed hereinafter.

First, during operation of the engine, intake air flows in a direction indicated by an arrow A in conduit 1 as shown in FIG. 1. At this time, a part of intake air flows through air inflow opening 21A of passage forming member 18 into bypass passage 21, and flows through outflow opening 21B into conduit 1 after passing through the position of air flow sensor element 24 in its flow-straightened state. Here, air flow sensor element 24 detects the flow amount of intake air flowing in conduit 1 and produces and outputs a detection signal out of the air flow meter through circuit board 23, connector section 13 and the like.

At this time, circuit board 23 and the like in casing 11 can be protected from foreign matters such as dust, water and the like because the circuit board and the like are interrupted in contact with intake air under the action of silicon-containing filler 26 and fluorine-containing sealant 27.

Additionally, even in case that intake air contains fuel gas (evaporated gas) and/or volatile components of gasoline, light oil or the like contained in exhaust gas, silicon-containing filler 26 can be securely prevented from melting and leaking out owing to contact with the volatile components in intake air because installation plate insertion groove 16 in circuit accommodating section 14 is closed or blocked with fluorine-containing sealant 27 having a high durability to the volatile components.

During assembly of casing 11, as shown in FIG. 6, after installation plate 22, circuit board 23, air flow sensor element 24 and the like are assembled in the side of accommodating casing 14A of circuit accommodating section 14, lid member 19 is installed to the side surface of the passage forming member 18 thereby closing the opened side of the U-shaped groove 18A so as to form bypass passage 21. By this, installation plate insertion groove 16 in the accommodating casing 14A is generally isolated by stopper member 20 of lid member. Then, the air flow sensor element 24 comes into a condition where the connecting section 24C is disposed inside board installation recess 15 while the temperature sensing resistor 24B is disposed in bypass passage 21.

The gel (polymer) material which will become fluorine-containing sealant 27 is applied around installation plate insertion groove 16 and stopper member 20 from the opened side of accommodating casing 14A and solidified thereby forming fluorine-containing sealant 27. Further, the gel (material) which will become silicon-containing filler 26 is filled in the board installation recess 15 and solidified thereby forming silicon-containing filler 26.

Thus, circuit board 23 comes into a condition in which the whole of it is generally covered with silicon-containing filler 26 and fluorine-containing sealant 27. Then, lid plate 14B is installed to the opened side of accommodating casing 14A to close board installation recess 15, thereby assembling casing 11.

As apparent from the above, according to the embodiment of the present invention, fluorine-containing sealant 27 is disposed in board installation recess 15 of circuit accommodating section 14 at a position around installation plate insertion groove 16. Consequently, for example, even in case that intake air flowing through bypass passage 21 contains the volatile (fuel) components, a slight clearance formed among the members or sections defining installation plate insertion groove 16, installation plate 22, the surface of air flow sensor element 24 and stopper member 20 can be securely sealed with fluorine-containing sealant 27 having a high durability and good elastomeric characteristics thereby maintaining a stable isolation of silicon-containing filler 26 inside circuit accommodating section 14 from intake air.

Thus, fluorine-containing sealant 27 can securely prevents silicon-containing filler 26 from melting and leaking out through installation plate insertion groove 16 of circuit accommodating section 14 so as to adhere to temperature sensing resistor 24B and the like of the air flow sensor element 24 owing to contact of silicon-containing filler 26 with the volatile (fuel) components contained in intake air causing deterioration of the silicon-containing filler. This can maintain a detection operation of air flow sensor element 24 in a good condition for a long time, while improving the durability and reliability of the air flow meter.

In the embodiment, fluorine-containing sealant 27 is disposed within circuit accommodating section 14 at the position around installation plate insertion groove 16, and therefore a major part (other than a part covered with the fluorine-containing sealant) of circuit board 23 can be covered with silicon-containing filler 26 which is formed as a generalized product from the gel of the silicon-containing material or the like, within the circuit accommodating section 14. This saves the amount of use of fluorine-containing sealant 27 thus achieving a cost reduction of the air flow meter.

Further, lid member 19 for passage forming member 18 has stopper member 20 which closes installation plate insertion groove 16 of circuit accommodating section 14, and therefore fluorine-containing sealant 27 is merely required to seal the slight clearance formed around stopper member 20 within installation plate insertion groove 16 thereby stably exhibiting a good sealing performance with a small amount of fluorine-containing sealant.

Furthermore, during assembly of the air flow meter, stopper member 20 can be readily disposed in installation plate insertion groove 16 by installing lid member 19 onto passage forming member 18. Merely by applying the gel polymer material (becoming as fluorine-containing sealant 27) around installation plate insertion groove 16 and solidifying the gel polymer material after installation of the lid member, fluorine-containing sealant 27 can be readily filled among respective bonding wires 25 and the like without forming clearance.

Moreover, during the above operation of filling fluorine-containing sealant 27, stopper member 20 can prevent the gel polymer material from flowing out to the side of temperature sensing resistor 24B of air flow sensor element 24 through installation plate insertion groove 16, thereby smoothly carrying out the filling operation of the fluorine-containing sealant. During use of the air flow meter, stopper member 20 can prevent fluorine-containing sealant 27 from dispersing out of the position owing to deterioration with age or the like, thus improving a durability of the air flow meter.

Figure 7:
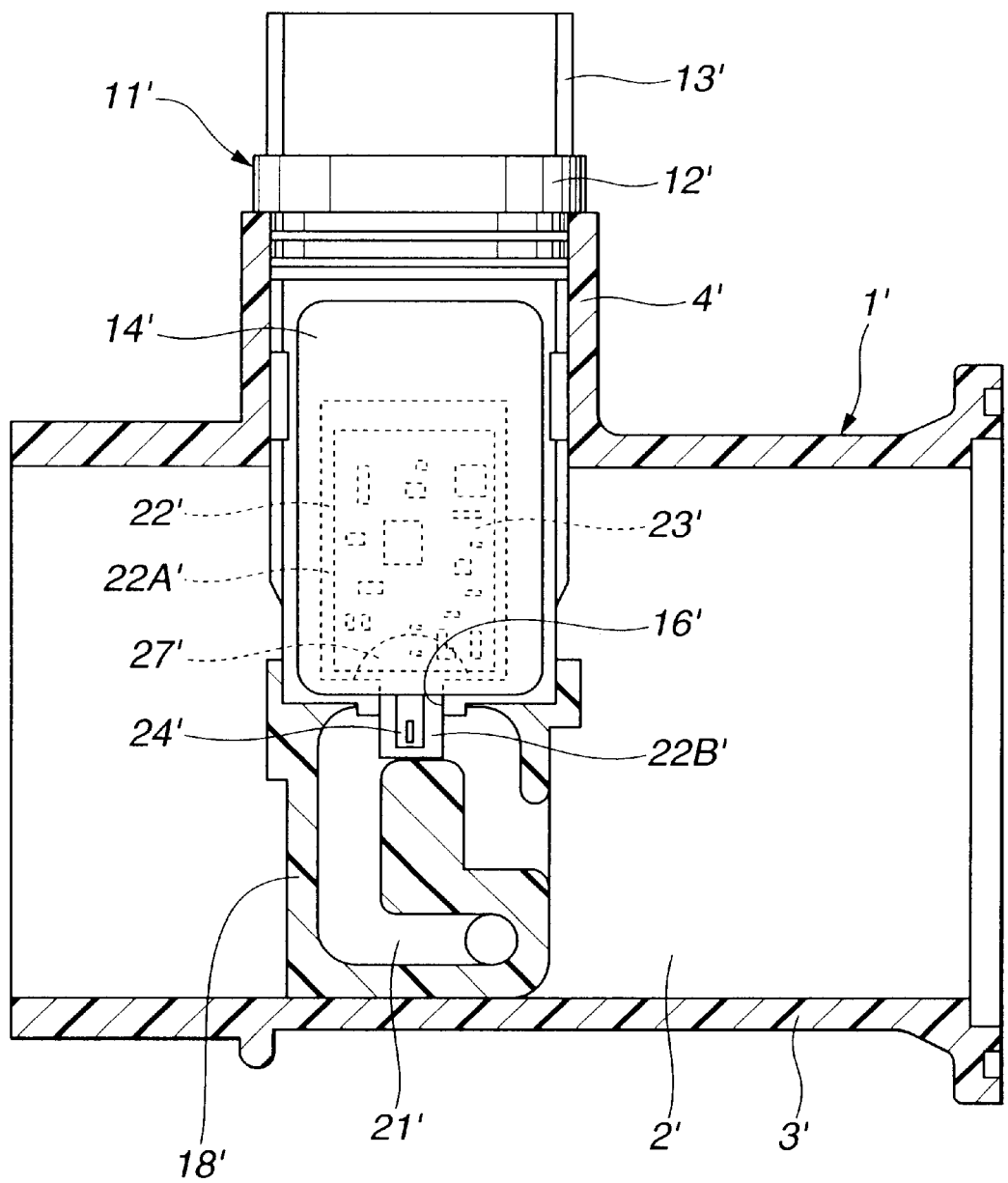
FIG. 7 is a vertical sectional view similar to FIG. 1 but showing a modified embodiment of the fluid flow meter according to the present invention, in a condition to be installed to a conduit.
Figure 8:
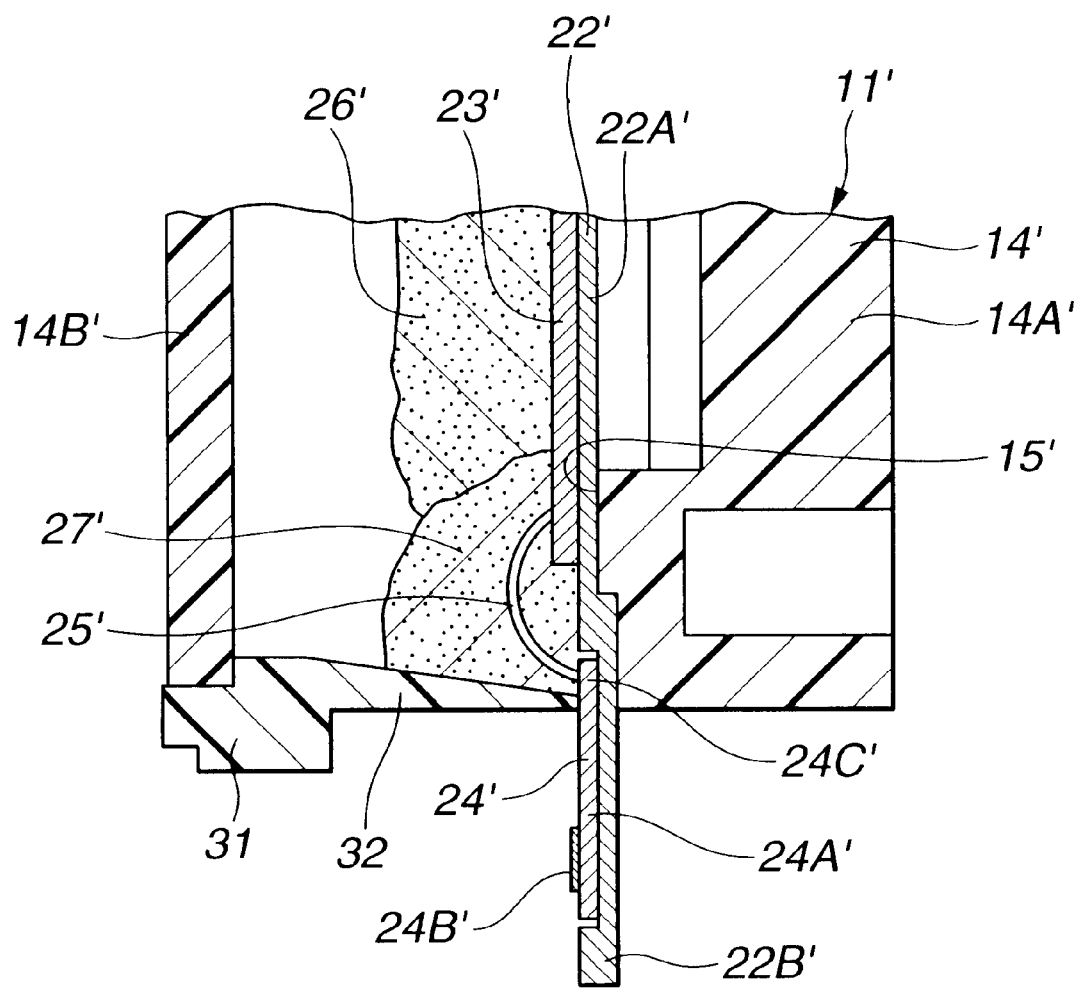
FIG. 8 is an enlarged fragmentary sectional view similar to FIG. 5 but showing an essential part of the modified embodiment of FIG. 7 and illustrating a silicon-containing filler, a fluorine-containing sealant and the like in a casing.

While circuit accommodating section 14 and passage forming member 18 have been shown and described as being formed integral with each other in casing 11 in the embodiment, it will be understood that the principle of the present invention may be applied to the air flow meter arranged such that passage forming member 18' is formed integral with conduit 1' (not with casing 11') while element installation section 22B' of installation plate 22' is inserted into bypass passage 21' from the upper side of passage forming member 18', as shown in a modified embodiment illustrated in FIGS. 7 and 8. In this case, a lid member 31 is installed to the tip end side of circuit accommodating section 14' so as to tightly close a space between accommodating casing 14A' and lid plate 14B' as shown in FIG. 8. lid member 31 has a stopper member 32 for closing installation plate insertion groove 16'.

As appreciated from the above, according to the present invention, the fluorine-containing sealant is disposed in the board installation recess of the casing at the position around installation plate insertion groove. Consequently, for example, even in case that a measured fluid or gas contains the volatile (fuel) components, the installation plate insertion groove can be securely sealed with fluorine-containing sealant 27 having a high durability against the volatile components thereby maintaining a stable isolation of the silicon-containing filler filled inside the board installation recess of the casing from the measured fluid. This can securely prevent the silicon-containing filler from melting and leaking out through the installation plate insertion groove of the circuit accommodating section so as to adhere to the sensor part and the like of the air flow sensor element owing to contact of the silicon-containing filler with the volatile (fuel) components contained in the measured fluid causing deterioration of the silicon-containing filler. Thus, a detection operation of the air flow sensor element can be maintained in a good condition for a long time, while improving the durability and reliability of the air flow meter.

The contents of Japanese Patent Application No. 2000-376454, filed Dec. 11, 2000, is incorporated by reference.

What is claimed is:

1. A fluid flow meter comprising:
   a casing installed to a conduit in which a measured gas flows, said casing comprising a main body section defining a board installation recess, and a peripheral wall section projecting from the main body section and surrounding the board installation recess, a part of the peripheral wall section being cut out to form an installation plate insertion groove, the part abutting to an inside of the conduit;
   an installation plate comprising a board installation section disposed in the board installation recess, and an element installation section extending from the board installation section through the installation plate insertion groove to an outside of the board installation recess;
   a circuit board disposed on the board installation section of said installation plate, electronic parts being provided to said circuit board;
   a gas flow sensor element disposed on the element installation section of said installation plate, said gas flow sensor element detecting a flow amount of the measured gas;
   a silicon-containing filler disposed in the board installation recess of said casing to cover the circuit board, said silicon-containing filler being formed of a material containing silicon;
   and a fluorine-containing sealant disposed in the board installation recess at a portion close to the installation plate insertion groove, said fluorine-containing sealant sealing the installation plate insertion groove so as to maintain said silicon-containing filler inside the board installation recess, said fluorine-containing sealant being formed of a material whose major component is a polymer containing fluorine.

2. A fluid flow meter as claimed in claim 1, wherein the gas sensor element extends through the installation plate insertion groove into the board installation recess so that a part of the gas flow sensor element is located within the board installation recess, a surface of the part of the gas flow sensor element being covered with said fluorine-containing sealant.

3. A fluid flow meter as claimed in claim 1, further comprising a stopper member connected to said casing and located within the installation plate insertion groove of said casing to close the installation plate insertion groove so as to prevent the fluorine-containing sealant from flowing out through the installation plate insertion groove.

4. A fluid flow meter as claimed in claim 3, wherein said casing comprising a passage forming member disposed at a position abutting to the element installation section of said installation plate, said passage forming member being formed with a groove, and a lid member secured to the passage forming member to close the groove so as to form a bypass passage through which a part of gas flowing in the conduit flows, said gas flow sensor element projecting in the bypass passage.

5. An air flow meter for intake air of an automotive internal combustion engine, comprising:
   a casing installed to an intake air pipe in which intake air flows, said casing comprising a main body section defining a board installation recess, and a peripheral wall section projecting from the main body section and surrounding the board installation recess, a part of the peripheral wall section being cut out to form first and second end portions which are separate from each other to define therebetween an installation plate insertion groove, the part abutting to an inside of the conduit, the first and second end portions having respectively first and second edges which face each other and parallel with each other;
   an installation plate comprising a board installation section disposed in the board installation recess, and an element installation section extending from the board installation section through the installation plate insertion groove to an outside of the board installation recess;
   a circuit board disposed on the board installation section of said installation plate, electronic parts being provided to said circuit board;
   an air flow sensor element disposed on the element installation section of said installation plate, said air flow sensor detecting a flow amount of intake air, said air flow sensor element comprising a temperature sensing resistor;

a silicon-containing filler disposed in the board installation recess of said casing to cover the circuit board, said silicon-containing filler being formed of a material containing silicon;

a fluorine-containing sealant disposed in the board installation recess at a portion close to the installation plate insertion groove, said fluorine-containing sealant sealing the installation plate insertion groove so as to maintain said silicon-containing sealant inside the board installation recess, said fluorine-containing sealant being formed of a material whose major component is a polymer containing fluorine; and a plate-shaped stopper member connected to said casing and inserted in the installation plate insertion groove of said casing and fitted between the first and second edges of the respective first and second end portions of the peripheral wall section of said casing, said stopper member having a tip end in contact with said air flow sensor element, the temperature sensing resistor of said air flow sensor element and said silicon-containing filler being located respectively on opposite sides of said stopper member.

* * * * *